W. BANKSON.
Wheel-Cultivator.
No. 46,537.
Patented Feb. 28, 1865.
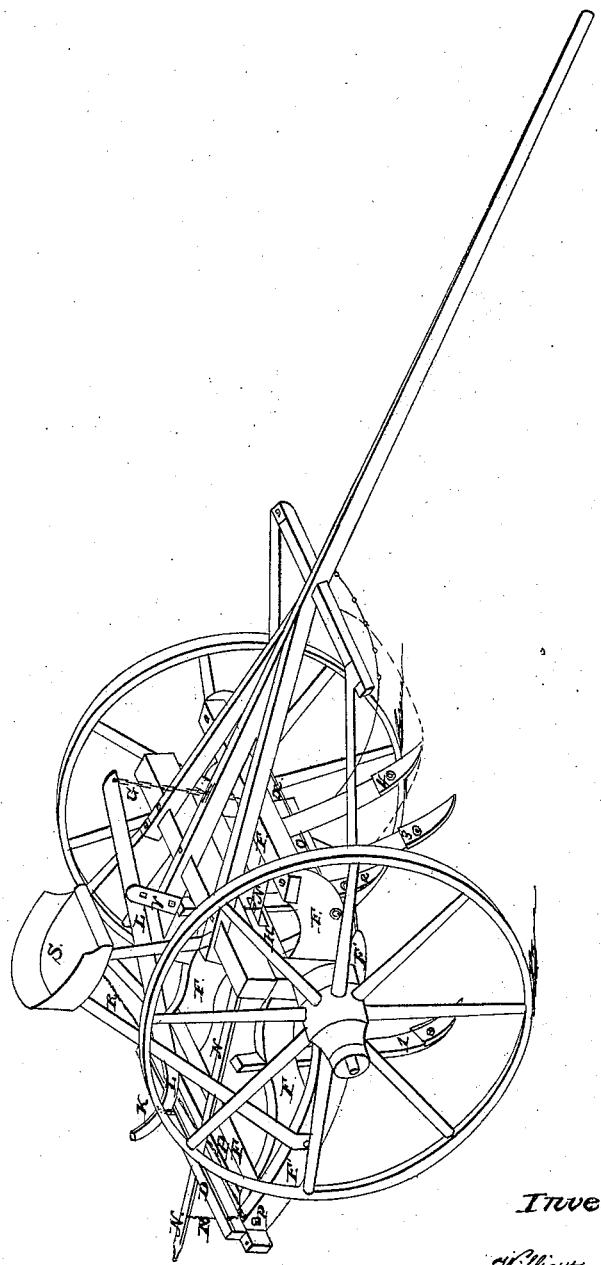

UNITED STATES PATENT OFFICE.

WM. BANKSON, OF MOUNT PLEASANT, IOWA.

IMPROVEMENT IN CULTIVATORS.

Specification forming part of Letters Patent No. 46,537, dated February 23, 1865.

*To all whom it may concern:*

Be it known that I, WILLIAM BANKSON, of Mount Pleasant, in the county of Henry and State of Iowa, have invented a new Corn Plow or Cultivator; and I do hereby declare that the following is a full and exact description thereof, reference being had to the accompanying drawing, and to the letters of reference marked thereon.

The nature of my invention consists in attaching the four shovels or plows 1 2 3 4 to the frame F F F, which is made in width to suit the corn-planter of any gage he may think fit, the plows 1 and 2 set fourteen inches apart from front plows, 3 and 4. This frame is hung on the outer frame, F' F', as seen at the point P, by the same rod, P P, and raised up or let down at will by the lever L on the fulcrum at V, the forward end of the lever attached to the front bar of the frame by the chain G, and the position of the lever, when raised, held so by the hook or catch, as seen at K, on the bar D, under which the lever is held, this lever being controlled by the driver on the seat S or by a footman behind the plow with equal ease.

My plan of moving the front shovels or plows from right to left is seen by their being suspended on the bar H, which crosses the front of this frame F F, attached by the short bar O, boxed on the plows immediately behind the rod H, which bar O is moved from right to left by the lever N, loosely bolted on its center and moving on its own fulcrum through the cross-bar H, and passing under the bar D to the hind end of the plow, where the footman easily controls the front shovels or the driver the same off the seat S by the ropes R, attached to the lever and brought over a pulley in the corner of the frame F, and from thence to the right and left sides of the driver's seat S, where he can control them at will.

What I claim as my invention, and desire to secure by Letters Patent, is—

The frame F F, the lever L, the suspension of the plows 3 and 4 on the bar H, and the moving of them with the lever N, when constructed substantially as described, and for the purposes set forth.

WILLIAM BANKSON.

Witnesses:
WOODSON S. ESTES,
B. EBBITT.